United States Patent
Yu

(10) Patent No.: US 7,321,334 B2
(45) Date of Patent: Jan. 22, 2008

(54) WIRELESS COMMUNICATION MODULE FOR A PORTABLE ELECTRONIC DEVICE

(75) Inventor: Jen-Huan Yu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 60 days.

(21) Appl. No.: 11/333,275

(22) Filed: Jan. 18, 2006

(65) Prior Publication Data

US 2007/0103372 A1    May 10, 2007

(51) Int. Cl.
*H01Q 1/24* (2006.01)
(52) U.S. Cl. .................... 343/702; 455/567; 455/575.7
(58) Field of Classification Search ............... 455/423, 455/575.7, 567; 343/702
See application file for complete search history.

(56) References Cited

U.S. PATENT DOCUMENTS

| | | | | |
|---|---|---|---|---|
| 6,507,322 | B2 * | 1/2003 | Fang et al. | 343/770 |
| 6,942,149 | B2 * | 9/2005 | Fujii et al. | 235/451 |
| 2005/0159148 | A1 * | 7/2005 | Habuka et al. | 455/423 |

* cited by examiner

Primary Examiner—Tho Phan
(74) Attorney, Agent, or Firm—Bacon & Thomas, PLLC

(57) ABSTRACT

A wireless communication module used for a portable electronic device comprises a first antenna module and a second antenna module, which first antenna module has a first antenna for transmitting and receiving of wireless signals, an electronic circuit for coding and decoding of wireless signals, and a detector for detecting of signal intensity, and which second antenna module has a signal transmission line and a second antenna for transmitting and receiving of wireless signals; the first antenna module connects to the second antenna module via the signal transmission line of the second antenna mode to have the detector of the first antenna module can detect and compare the signal intensity of the first and second antennas, when a weaker signal is detected at the first antenna of the first antenna module, the signal transmission/receiving task is actively shifted to the second antenna of the second antenna module; the wireless signal received by the first antenna of the first antenna module or by the second antenna of the second antenna module after shifting is sent to the electronic circuit of the first antenna module for decoding into a digital signal, therefore, the wireless communication module of the invention can solve the problem of interruption due to adverse surrounding conditions.

4 Claims, 3 Drawing Sheets

WIRELESS COMMUNICATION MODULE FOR A PORTABLE ELECTRONIC DEVICE

BACKGROUND OF THE PRESENT INVENTION

1. Field of the Invention

The present invention related generally to a wireless communications module, more particularly to a wireless communication module used for a portable electronic device to transmit, receive and process signals.

2. Description of the Prior Art

With the development of network technology and the popularization of its application, more and more portable electronic devices, such as notebooks (NB) or personal digital assistants (PDA), are equipped with wireless network receiving/transmission interfaces and wireless communication functions.

As the U.S. Pat. No. 584,292 shows, the key technology to provide a portable electronic device with wireless communication function is to install a wireless communication module in the casing of the display panel and on the upper edge of a display panel of the portable electronic device. The wireless communication module connects to the motherboard of the portable electronic device via a digital transmission line to transmit, receive and process signals of a wireless local area network (WLAN).

However, this wireless communication module for the portable electronic device does not have a second antenna nor an active sensing function to detect the intensity of the signal. As a result, this module is not capable of switching to an antenna with better signal transmission/receiving conditions according to the signal intensity of the wireless local area network. Consequently, transmission and receiving of wireless signals are interrupted from time to time by surrounding terrains and surface features and, thus, the stability and speed of the transmission or receiving are affected.

SUMMARY OF THE INVENTION

The primary objective of the present invention is to improve the prior art wireless communication module of portable electronic devices. The wireless communication module of the present invention is comprised of a detector and two sets of antennas. When wireless signals are transmitted or received, the detector will actively detect the signal intensity of each antenna set in a wireless local area network and switch to the antenna with better conditions to transmit/receive wireless signals. The wireless communication module of the present invention can solve the problems of interruption due to surrounding terrains and surface features and ensures the best transmission/receiving quality of portable electronic devices.

Another objective of the present invention is to provide a wireless communication module disposed between the display panel of a portable electronic device and the casing of the display panel. The wireless communication module is comprised of a first antenna module and a second antenna module. The first antenna module has a first antenna for transmission and receiving of wireless signals, an electronic circuit for coding and decoding of wireless signals, and a detector for detection of signal intensity. The second antenna module has a signal transmission line and a second antenna for transmission and receiving of wireless signals. The first antenna module connects to the second antenna module via the signal transmission line of the second antenna mode, so that the detector of the first antenna module can detect and compare the signal intensity of the first and second antennas. When a weaker signal is detected at the first antenna of the first antenna module, the signal transmission/receiving task is actively shifted to the second antenna of the second antenna module to ensure signal transmission/receiving stability for portable electronic devices in a wireless local area network.

DETAILED DESCRIPTION OF THE INVENTION

Figure 1:
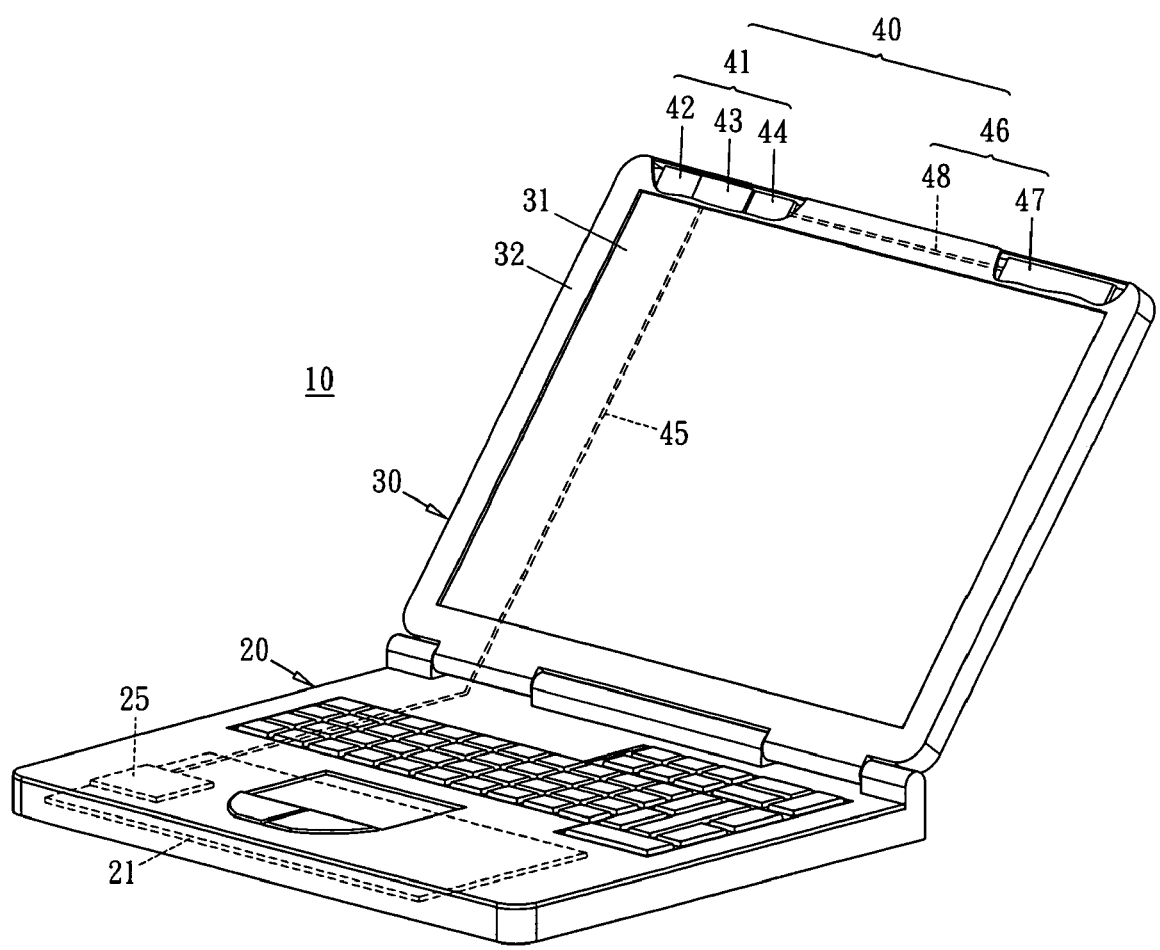
FIG. 1 shows a structural view and a first embodiment view of a wireless communication module of the present invention.

As shown in FIG. 1, the wireless communication module 40 has two sets of antennas and can actively shift to the antenna with better conditions to transmit/receive signals.

The wireless communication module 40 of the present invention is comprised of a first antenna module 41 and a second antenna module 46. The first antenna module 41 has a first antenna 42 for transmission and receiving of wireless signals, an electronic circuit 43 for coding and decoding of wireless signals, and a detector 44 for detection of signal intensity. The second antenna module 46 has a signal transmission line 48 and a second antenna 47 for transmission and receiving of wireless signals.

The first antenna module 41 connects to the second antenna module 46 via the signal transmission line 48 of the second antenna mode 46. The wireless signal received by the second antenna 47 of the second antenna module 46 is transmitted to the electronic circuit 43 of the first antenna module 41 via the signal transmission line 48 for decoding into a digital signal. In the contrary, a digital signal is coded into a wireless signal by the electronic circuit 43 of the first antenna module 41 and transmitted to the second antenna 47 of the second antenna module 46 via the transmission line 48 for further transmission.

The portable electronic device 10 basically comprises a platform 20 and a display module 30. The platform 20 has an internally disposed motherboard 21, which has a signal processor 25. The display module 30 has a display panel 31 and a casing 32 for installation thereof. A space is reserved between the display panel 31 and the casing 32 of the display module 30 for installation of the wireless communication module 40.

Figure 2:
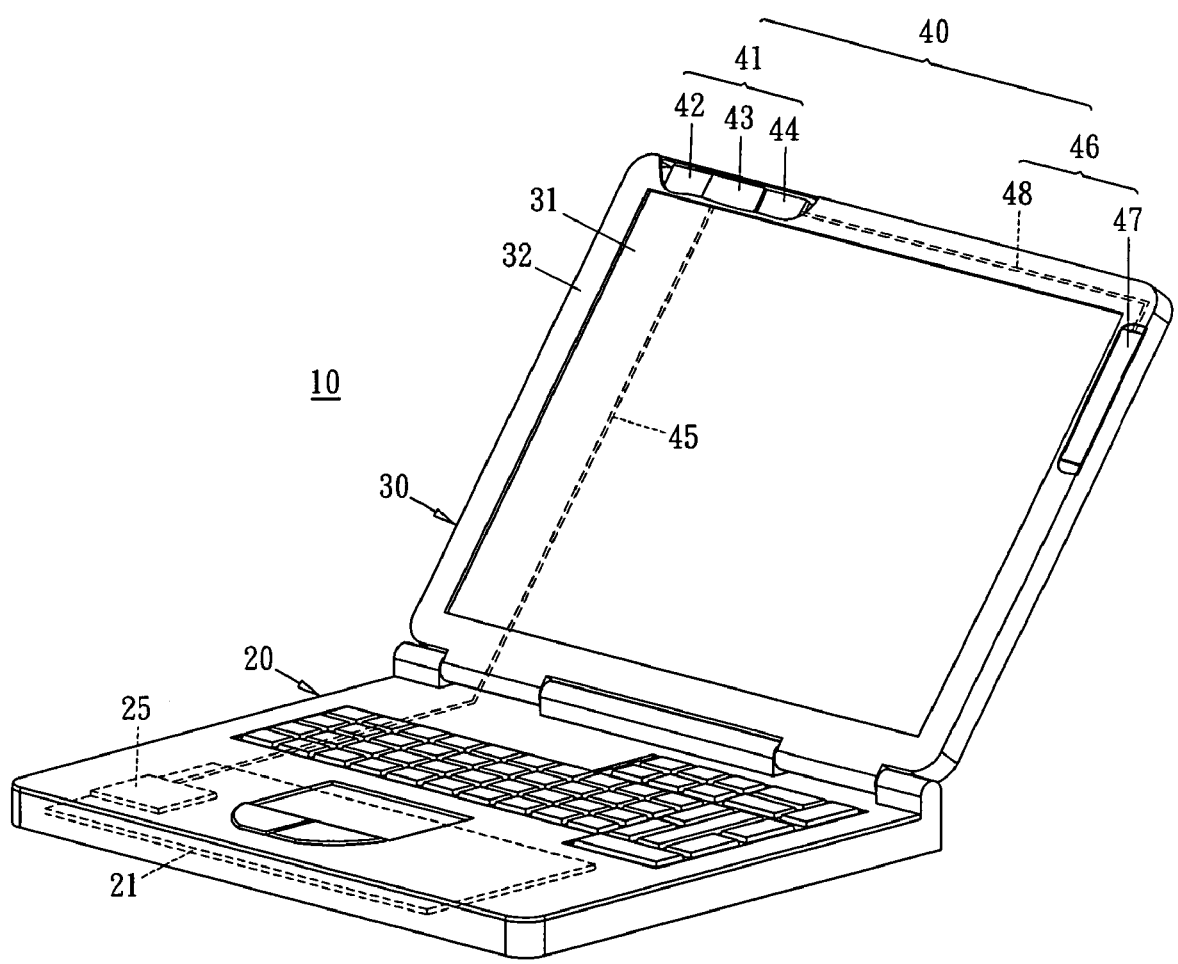
FIG. 2 shows a second embodiment view of the wireless communication module of the present invention.
Figure 3:
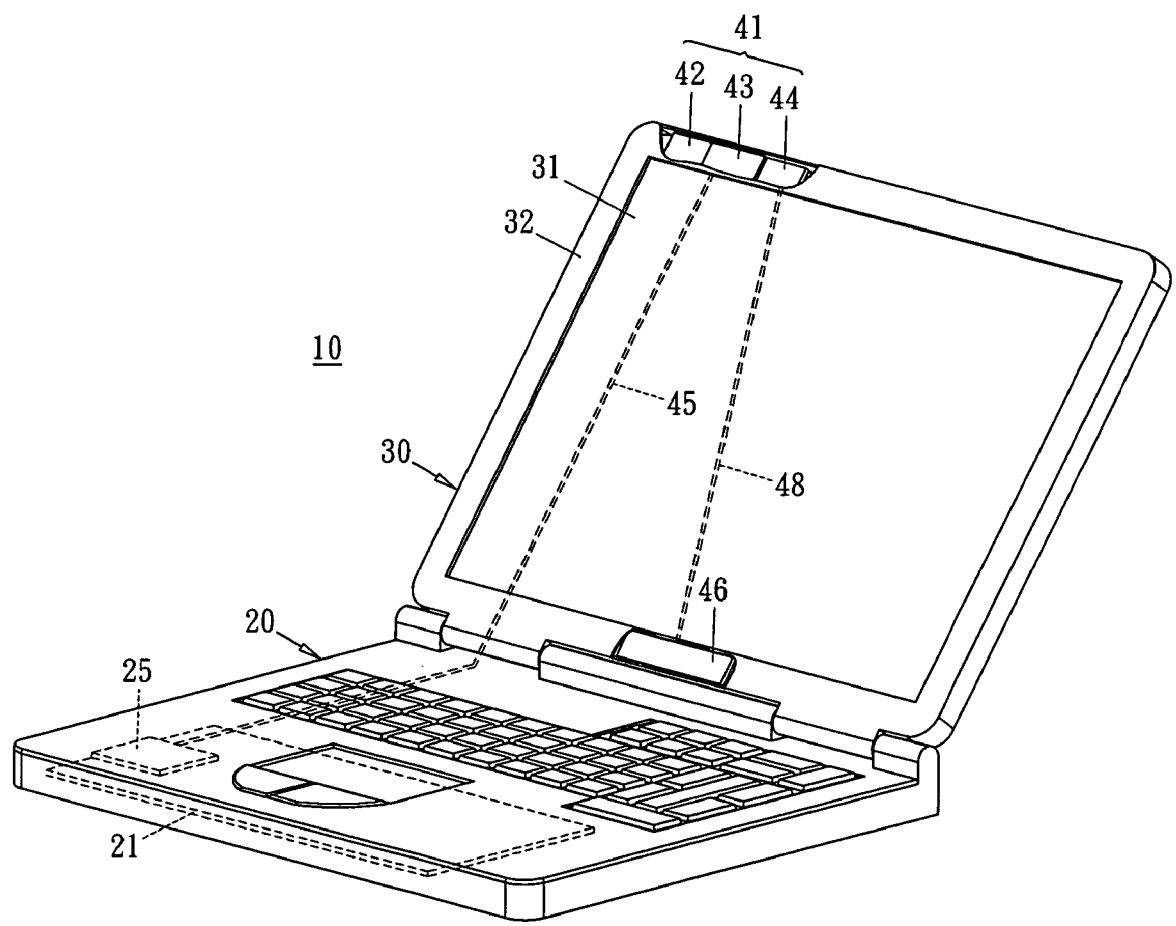
FIG. 3 shows a third embodiment view of the wireless communication module of the present invention.

At least three positions are selectable for installation of the wireless communication module 40 in the portable electronic device 10 between the display panel 31 and the casing 32 of the display module 30. As shown in FIG. 1, both the first antenna module 41 and the second antenna module 46 of the wireless communication module 40 are disposed on the upper side of the display panel 31; or, the first antenna module 41 and the second antenna module 46 of the wireless communication module 40 are disposed on the upper side and right/left side, respectively, of the display panel 31 as shown in FIG. 2; or the first antenna module 41 and the second antenna module 46 of the wireless communication module 40 are disposed on the upper side and lower side, respectively, of the display panel 31 as shown in FIG. 3, and a connection is established to the electronic circuit 43 of the first antenna module 41 via the signal transmission line 48 of the second antenna module 46.

When the installation of the wireless communication module 40 is completed, The first antenna module 41 of the wireless communication module 40 is connected to the signal processor 25 of the portable electronic device 10 via a signal transmission line 45, thereby the wireless communication module 40 of the present invention becomes a wireless transmission/receiving interface of the portable electronic device 10, such as a notebook (NB) or a personal digital assistant (PDA).

When the portable electronic device 10 with the wireless communication module 40 of the present invention is used to transmit/receive signals in a wireless local area network, the detector 44 of the first antenna module 41 of the wireless communication module 40 continually detects and compares the signal intensity transmitted/received by the first antenna 42 and the second antenna 47. As a weaker signal is detected at the first antenna 42, the transmission/receiving task will be actively shifted to the second antenna 47 to improve the stability of the signal. Thus, the wireless communication module 40 of the present invention solves the problem of interruption due to surrounding terrains and surface features and provides the portable electronic device 10 with the best signal quality in a wireless local area network.

No matter whether a signal is transmitted to/received from the first antenna 42 of the first antenna module 41 of the wireless communication module 40, or an active switching to the second antenna 47 of the second antenna module 46 occurs, the received signal is sent immediately to the electronic circuit 43 of the first antenna module 41 for decoding into a digital signal. Then the decoded digital signal is sent to the motherboard 21 of the portable electronic device 10 via the signal transmission line 45 for processing by the signal processor 25 on the motherboard 21.

Similarly, the output signal from the signal processor 25 on the motherboard 21 of the portable electronic device 10 is sent to the electronic circuit 43 of the first antenna module 41 of the wireless communication module 40 via the signal transmission line 45 for coding into a wireless signal. The coded wireless signal is then further transmitted to other nodes from the first antenna 42 of the first antenna module 41 or actively shifted to the second antenna 47 of the second antenna module 46 for further transmission.

Although this invention has been disclosed and illustrated with reference to particular embodiments, the principles involved are applicable for use in numerous other embodiments that will be apparent to persons skilled in the art. This invention is, therefore, to be limited only as indicated by the scope of the appended claims.

What is claimed is:

1. A wireless communication module for a portable electronic device, comprising a first antenna module and a second antenna module disposed between a display panel of the portable electronic device and a casing of the display panel, wherein the first antenna module is connected to a signal processor of the portable electronic device via a signal transmission line, the first antenna module having a first antenna for transmission and receiving of wireless signals, an electronic circuit for coding and decoding of wireless signals, and a detector for detection of signal intensity; and the second antenna module having a signal transmission line and a second antenna for transmission and receiving of wireless signals; the first antenna module connected to the second antenna module via the signal transmission line of the second antenna module, and the detector of the first antenna module detecting and comparing the signal intensity of the first antenna and the second antenna in a wireless local area network for switching to a one of the first antenna and the second antenna having better conditions to transmit/receive wireless signals.

2. The wireless communication module for a portable electronic device as cited in claim 1, wherein both the first antenna module and the second antenna module are disposed on an upper side of the display panel and located into space between the display panel of the portable electronic device and the casing of the display panel.

3. The wireless communication module for a portable electronic device as cited in claim 1, wherein the first antenna module and the second antenna module are disposed on said upper side and right/left side of the display panel respectively and located into space between the display panel of the portable electronic device and the casing of the display panel.

4. The wireless communication module for a portable electronic device as cited in claim 1, wherein the first antenna module and the second antenna module are disposed on said upper side and lower side of the display panel respectively and located into space between the display panel of the portable electronic device and the casing of the display panel.

* * * * *